United States Patent
Mukaida et al.

(10) Patent No.: US 11,256,432 B2
(45) Date of Patent: Feb. 22, 2022

(54) MEMORY CONTROLLER AND MEMORY SYSTEM

(71) Applicant: TDK CORPORATION, Tokyo (JP)

(72) Inventors: Naoki Mukaida, Tokyo (JP); Kenichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/574,340

(22) Filed: Sep. 18, 2019

(65) Prior Publication Data
US 2020/0159411 A1 May 21, 2020

(30) Foreign Application Priority Data

Nov. 21, 2018 (JP) .............................. JP2018-218054

(51) Int. Cl.
*G06F 3/06* (2006.01)
*G06F 12/06* (2006.01)

(52) U.S. Cl.
CPC ............ *G06F 3/064* (2013.01); *G06F 3/0607* (2013.01); *G06F 3/0658* (2013.01); *G06F 3/0659* (2013.01); *G06F 3/0679* (2013.01); *G06F 12/0646* (2013.01)

(58) Field of Classification Search
None
See application file for complete search history.

(56) References Cited

U.S. PATENT DOCUMENTS

| | | | | |
|---|---|---|---|---|
| 2010/0017555 A1* | 1/2010 | Chang | .............. | G06F 12/0246 711/103 |
| 2010/0262766 A1* | 10/2010 | Sprinkle | ............. | G06F 12/0813 711/103 |
| 2011/0055458 A1* | 3/2011 | Kuehne | ............... | G06F 12/0246 711/103 |
| 2012/0079169 A1* | 3/2012 | Shen | ................... | G06F 12/0246 711/103 |
| 2013/0282954 A1* | 10/2013 | Sankar | ................. | G06F 3/0632 711/103 |

(Continued)

FOREIGN PATENT DOCUMENTS

| | | | |
|---|---|---|---|
| JP | 2005-275722 A | 10/2005 | |
| JP | 2010-250413 A | 11/2010 | |

(Continued)

*Primary Examiner* — Stephanie Wu
(74) *Attorney, Agent, or Firm* — Oliff PLC

(57) ABSTRACT

A memory controller capable of preventing important data stored in a flash memory from being lost and maintaining the quality of a physical block. A memory controller for controlling access to a flash memory including a plurality of physical blocks, each of which includes a plurality of pages, based on a command assigned from a host system. The memory controller stores a first correspondence relationship between a logical block of a first logical region and a physical block of a first physical region in a first storage unit. The memory controller manages the first physical region in which a process of moving data saved in the physical block of the first physical region having the correspondence relationship with the logical block of the first logical region is prohibited without being based on a command for writing the data to the first logical region assigned from the host system.

3 Claims, 6 Drawing Sheets

(56) References Cited

U.S. PATENT DOCUMENTS

| | | | | |
|---|---|---|---|---|
| 2014/0379971 | A1* | 12/2014 | Putro | G06F 11/108 |
| | | | | 711/103 |
| 2015/0277787 | A1 | 10/2015 | Takubo et al. | |
| 2016/0313943 | A1* | 10/2016 | Hashimoto | G06F 3/061 |
| 2017/0235489 | A1* | 8/2017 | Lin | G11C 11/5628 |
| | | | | 711/103 |

FOREIGN PATENT DOCUMENTS

| | | |
|---|---|---|
| JP | 4952740 B2 | 6/2012 |
| JP | 2015-191294 A | 11/2015 |
| JP | 5858081 B2 | 2/2016 |

* cited by examiner

MEMORY CONTROLLER AND MEMORY SYSTEM

BACKGROUND OF THE INVENTION

Field of the Invention

The present invention relates to a memory controller and a memory system.

Priority is claimed on Japanese Patent Application No. 2018-218054, filed Nov. 21, 2018, the content of which is incorporated herein by reference.

Description of Related Art

A NAND type flash memory includes a plurality of physical blocks, each physical block includes a plurality of pages, data is read and written in units of pages, and data is erased in units of physical blocks. A memory controller of the NAND type flash memory generally averages erase counts of a plurality of physical blocks, i.e., the memory controller performs a wear leveling process.

For example, a wear leveling process of Patent Document 1 is as follows. That is, an erase count is managed with respect to each of a plurality of physical blocks constituting a flash memory. When a difference between a maximum erase count and a minimum erase count has exceeded a threshold value, data written to a physical block with the minimum erase count is copied to a copy-destination physical block among spare blocks, the copy-destination physical block is allocated to an allocation-destination logical address of a copy-source physical block instead of the copy-source physical block (the physical block with the minimum erase count), and the copy-source physical block is managed as a spare block. The spare block is an erasure-completed physical block and is a writable physical block.

PATENT DOCUMENTS

[Patent Document 1] Japanese Unexamined Patent Application, First Publication No. 2005-275722
[Patent Document 2] Japanese Patent No. 5858081
[Patent Document 3] Japanese Patent No. 4952740

SUMMARY OF THE INVENTION

However, if data of a physical block to which important data is written is moved due to wear leveling when there is no write command from a host system, the data may be lost in a case in which the host system is powered off at that time or the like.

Also, in a physical block with a large erase count, the quality of a cell may deteriorate, data may deteriorate, and a reading error may be caused.

The present invention has been made in consideration of such circumstances and an objective of the present invention is to provide a memory controller and a memory system capable of preventing important data stored in a flash memory from being lost and maintaining the quality of a physical block.

According to an aspect of the present invention, there is provided a memory controller for controlling access to a flash memory including a plurality of physical blocks, each of which includes a plurality of pages, based on a command assigned from a host system, wherein the memory controller is configured to store a first correspondence relationship representing a correspondence relationship between a logical block of a first logical region and a physical block of a first physical region in a first storage unit, and wherein the memory controller is configured to manage the first physical region as a region in which a process of moving data saved in the physical block of the first physical region having the correspondence relationship with the logical block of the first logical region is prohibited without being based on a command for writing the data to the first logical region assigned from the host system.

According to an aspect of the present invention, there is provided a memory system including a flash memory including a plurality of physical blocks, each of which includes a plurality of pages, and a memory controller configured to control access to the flash memory based on a command assigned from a host system, wherein the memory controller is configured to store a first correspondence relationship representing a correspondence relationship between a logical block of a first logical region and a physical block of a first physical region in a first storage unit, and wherein the memory controller is configured to manage the first physical region as a region in which a process of moving data saved in the physical block of the first physical region having the correspondence relationship with the logical block of the first logical region is prohibited without being based on a command for writing the data to the first logical region assigned from the host system.

According to the present invention, it is possible to prevent important data stored in a flash memory from being lost and maintain the quality of a physical block.

DETAILED DESCRIPTION OF THE INVENTION

Embodiments

Figure 1:
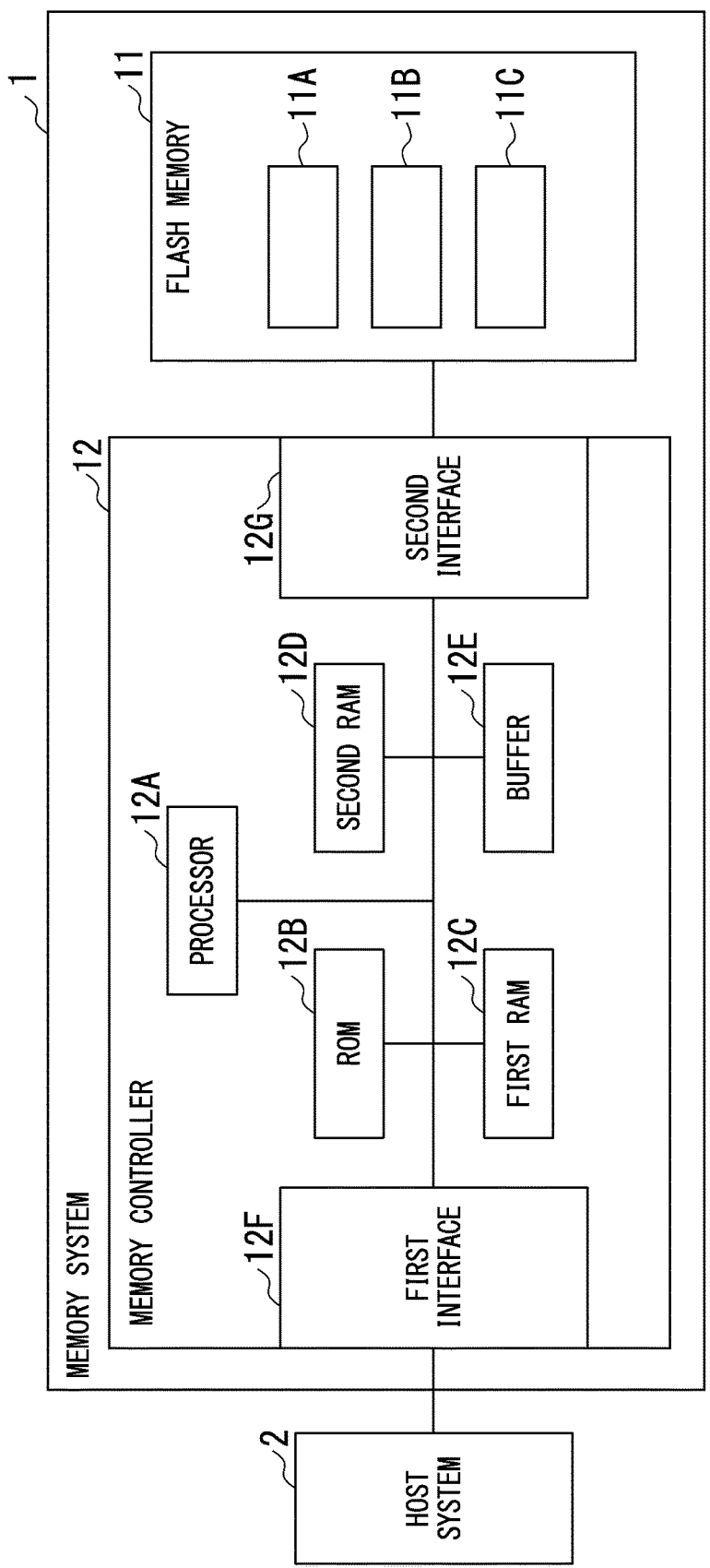
FIG. 1 is a diagram showing an example of a configuration of a memory system according to an embodiment.

Hereinafter, embodiments of the present invention will be described with reference to the drawings.
<Configuration of Memory System>
FIG. 1 is a diagram showing an example of a configuration of a memory system 1 according to an embodiment.

The memory system 1 is connected to a host system 2.

The memory system 1 includes a flash memory 11 and a memory controller 12.

The flash memory 11 may be one of various flash memories. For example, each cell included in the flash memory 11 may be a single-level cell (SLC), a multi-level cell (MLC), or a triple-level cell (TLC).

In the embodiment, a case in which the flash memory 11 is a NAND type flash memory will be described as an example.

In the flash memory 11, data is written and read in units of pages. Also, in the flash memory 11, data is erased in units of physical blocks.

The number of pages included in one physical block is a specified number. The specified number is of a plurality of types such as 32, 64, 128, and 256.

In this manner, the flash memory 11 is managed in units of physical blocks and units of pages.

The flash memory 11 is controlled by the memory controller 12. In the embodiment, at least some blocks of the plurality of physical blocks provided in the flash memory 11 are designated as any one of a first region 11A, a second region 11B, and a third region 11C by the memory controller 12.

Here, in the present embodiment, for convenience of description, a case in which respective regions (the first to third regions 11A to 11C) correspond to physical blocks of the flash memory 11 will be described.

Also, although three regions (the first to third regions 11A to 11C) are shown for convenience of description in the present embodiment, for example, other regions may be provided.

The first region 11A is a region of a physical block to which prescribed firmware for controlling access to the flash memory 11 is written by the memory controller 12 among a plurality of physical blocks provided in the flash memory 11.

When the firmware is updated, for example, writing is performed after erasure of the entire firmware of the destination physical block in which the firmware is stored. Also, a part of the firmware is not rewritten.

The second region 11B is a region of a physical block to which management information is written by the memory controller 12 (referred to as a "management block" for convenience of description). The management information includes, for example, information such as information indicating a position of the first region 11A within the flash memory 11, information indicating a position of the third region 11C within the flash memory 11, information indicating a position of another region when the other region is located within the flash memory 11, information indicating a type of flash memory 11, and setting information of the memory system 1.

Here, the setting information of the memory system 1 may include, for example, one or more pieces of information indicating the number of flash memories 11 (referred to as the "number of chips" for convenience of description) provided in one memory system 1, command support information, and functional support information.

In the present embodiment, for convenience of description, a case in which the number of flash memories 11 connected to the memory controller 12 is one, i.e., a case in which the number of chips is one, is shown. Also, the number of chips may be two or more. In this case, the memory controller 12 assigns an instruction for each flash memory by asserting an enable signal for each of the plurality of flash memories. Also, the memory controller 12 may perform parallel control by assigning instructions to two or more flash memories substantially simultaneously using a plurality of channels.

Here, the information indicating the position within the flash memory 11 may be, for example, information about an address within the flash memory 11.

Also, the information indicating the type of flash memory 11 includes, for example, information indicating the number of physical blocks provided in the flash memory 11, information indicating the number of pages included in one physical block, information indicating the maximum number of bytes capable of being stored in one page, and the like. The maximum number of bytes capable of being stored in one page may be regarded as a magnitude of a page size. The page size represents the number of bytes per page.

Also, the information indicating the type of flash memory 11 may include, for example, information indicating the order of connection when a plurality of flash memories 11 are connected and used. The information indicating the order may be, for example, a number (referred to as a "chip number" for convenience of description).

Also, the second region 11B includes at least information indicating a type of flash memory 11 and information indicating a position of the first region 11A within the flash memory 11 after initialization of the memory system 1.

The initialization of the memory system 1 is the initialization of the flash memory 11 by the memory controller 12. In the initialization, the memory controller 12 designates a region to function as each of the first region 11A, the second region 11B, and the third region 11C from at least some of the storage regions provided in the flash memory 11 and writes necessary information. The third region 11C is a region of a physical block to which data received from the host system 2 is written by the memory controller 12 (referred to as a "user data block" for convenience of description). User data is data written by the host system 2. Also, host data is data transmitted from the host system 2 to the memory system 1 and is included in the user data.

Here, the memory controller 12 stores and manages information indicating a correspondence relationship between a logical address designated by the host system 2 and a physical address in the flash memory 11 in the storage unit. The storage unit may be, for example, a management block having management information within the flash memory 11.

Also, information for identifying each region (referred to as "region identification information" for the convenience of description) is written to each of the first to third regions 11A to 11C.

The memory controller 12 controls access to the flash memory 11 based on a command assigned from the host system 2.

The memory controller 12 includes a processor 12A, a ROM 12B, a first RAM 12C, a second RAM 12D, a buffer 12E, a first interface 12F, and a second interface 12G.

The processor 12A controls the entire memory system 1. The processor 12A is, for example, a central processing unit (CPU). Also, the processor 12A may be another processor such as a field-programmable gate array (FPGA) instead of the CPU.

In the present embodiment, a process to be performed in the memory controller 12 is executed by the processor 12A.

The ROM 12B is, for example, a mask ROM, and is a ROM to which prescribed firmware for activating the memory system 1 is written. Thus, the ROM 12B is referred to by the processor 12A at an activation time of the memory controller 12 or the like. Then, at the activation time of the memory controller 12 or the like, the processor 12A reads the firmware and performs a process based on the firmware.

The ROM 12B stores firmware configured to perform a process of reading firmware, which, for example, controls access from the flash memory 11 at the activation time, and the like.

Here, in the present embodiment, the activation time of the memory controller 12 is a timing at which a drive voltage is supplied to the processor 12A and the processor 12A can operate normally. For example, the memory system 1 is connected to the host system 2, and therefore the drive voltage is supplied to the processor 12A.

Also, the activation time of the memory controller 12 may be a timing after a timing at which the processor 12A can operate normally.

Also, the activation time of the memory controller 12 may be another timing according to the processor 12A instead of a timing at which the processor 12A can operate normally or a timing after a timing at which the processor 12A can operate normally.

The first RAM 12C is a RAM to which the management information read from the second region 11B is written by the processor 12A.

Also, the first RAM 12C is used, for example, as a work region of the processor 12A.

The second RAM 12D is a RAM to which the firmware for controlling the access read from the first region 11A is written by the processor 12A. Also, the second RAM 12D is a RAM to which the firmware for the initialization of the memory system 1 received from the host system 2 is written by the processor 12A.

In this manner, the firmware to be processed by the processor 12A is located in the second RAM 12D.

Here, the firmware for the initialization of the memory system 1 is firmware for initializing the memory system 1. Also, the firmware that controls access is firmware that controls access to the memory system 1.

The buffer 12E holds data received from the host system 2 by the memory controller 12. Also, the buffer 12E holds data to be transmitted from the memory controller 12 to the host system 2.

Also, the buffer 12E holds read data from the flash memory 11 to the memory controller 12. Also, the buffer 12E holds data to be written from the memory controller 12 to the flash memory 11.

In this manner, the buffer 12E is used for a data transfer between the memory controller 12 and the host system 2 and a data transfer between the memory controller 12 and the flash memory 11.

The first interface 12F is an interface between the memory controller 12 and the host system 2 and transmits and receives signals or data. The first interface 12F may be any interface capable of being connected between the memory controller 12 and the host system 2 so that communication is possible.

The second interface 12G is an interface between the memory controller 12 and the flash memory 11 and performs signal transmission/reception or data reading/writing. The second interface 12G may be any interface capable of being connected between the memory controller 12 and the flash memory 11 so that communication is possible.

The host system 2 may be any device, and may be an industrial device operated by a prescribed operating system (OS) as in a workstation or the like as an example. As another example, the host system 2 may be a household device such as a personal computer (PC) instead of the industrial device or a device such as a multifunctional portable phone terminal (a smartphone).

In the present embodiment, the memory system 1 stores data received from the host system 2 in the flash memory 11 in response to a request from the host system 2. Also, in response to a request from the host system 2, the memory system 1 transmits data corresponding to the request within data stored in the flash memory 11 to the host system 2.

Also, the processor 12A reads activation firmware stored in the ROM 12B and searches for access control firmware written to the flash memory 11 based on the read firmware. Then, when the processor 12A detects the firmware written to the flash memory 11, the processor 12A reads the detected firmware to the second RAM 12D and executes the firmware to perform each process written to the firmware. Thereby, the processor 12A controls access to the flash memory 11 based on the firmware.

<Structure of Flash Memory>

The flash memory 11 has a plurality of physical blocks. Each physical block has a plurality of pages.

A physical block is a unit of erasure and a page is a unit of reading/writing. A page size is the number of bytes in one page.

<Free Physical Block>

In the flash memory 11, data is sequentially written in units of pages from the top page of the physical block, no data is overwritten, and new data is written after data of the physical block is erased.

In the present embodiment, the memory controller 12 manages a state of whether or not writing is possible and an erase count with respect to each physical block of a user data block. The memory controller may perform such management using, for example, a table. Here, a state in which writing is possible corresponds to a state in which at least some pages are not used for storing valid or invalid data. In contrast, a state in which writing is not possible corresponds to a state in which all pages are used for storing valid or invalid data and at least some of the pages are used for storing valid data. In this manner, if valid or invalid data is not written until the last page with respect to a physical block to which valid data is written, data can be written to a page to which no valid or invalid data is written.

Furthermore, the memory controller may manage whether or not each physical block is a bad physical block. Also, because a bad physical block is not usable (writing and erasure are not possible), management may be performed in consideration of a state in which valid or invalid data is stored in all the pages and valid data is stored in at least some of the pages.

The bad physical block is a physical block that cannot be used for writing data for some reason and detailed description thereof will be omitted in the present embodiment.

In the present embodiment, for convenience of description, a physical block in which all pages are not used for storing valid or invalid data will be referred to as a free physical block.

The free physical block includes an erasure-completed physical block in which data is erased and not stored and a physical block in which invalid data is stored but waiting for erasure. Because the memory controller 12 manages whether or not valid data is stored in each physical block, the physical block in which invalid data is stored is managed as an invalid physical block or a data erasure target.

Here, the valid data represents data for which there is no erasure request from the host system 2 within data having the same host address and within the latest data (the last written data). Also, the invalid data has the same host address as the valid data and represents data written before valid data or data for which there is an erasure request from the host system 2.

<Address Management>

Address management will be described.

Figure 2:
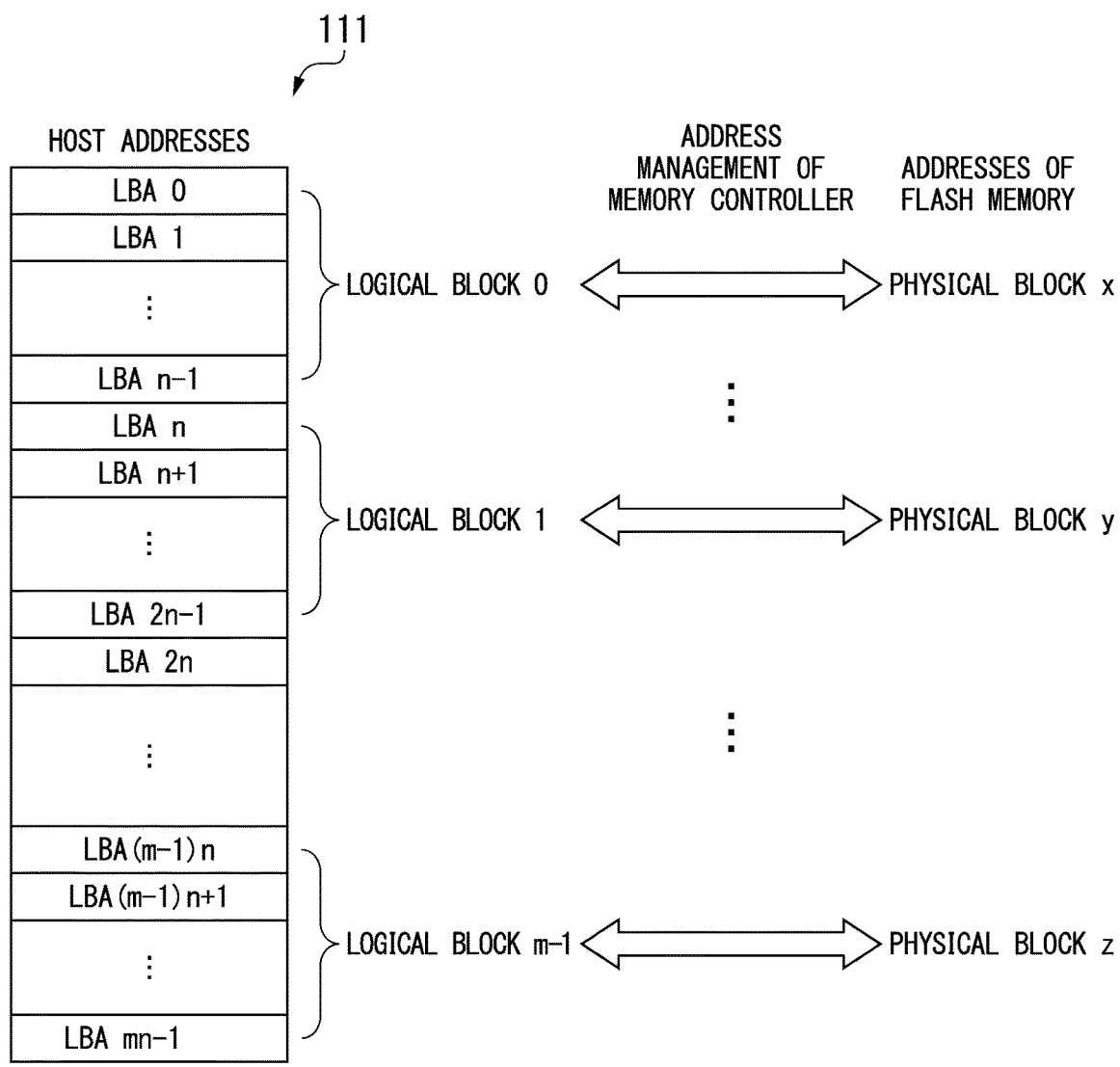
FIG. 2 is a diagram showing an example of host addresses and address conversion of a memory system according to the embodiment.

FIG. 2 is a diagram showing an example of host addresses and address conversion of the memory system according to the embodiment.

The memory controller 12 associates the host addresses of the host system 2 with logical blocks. Also, the logical blocks are associated with physical blocks of the flash memory 11.

The memory controller 12 manages a correspondence relationship between these addresses using an address management table.

The host system 2 manages addresses of a host address group 111 by logical block addressing (LBA). In the host address group 111, an order is assigned to a logical address for each logical sector for management. The logical sector is a 512-byte data block.

In the example of FIG. 2, there are logical addresses of LBA 0 to mn−1. Here, n and m each represent an integer of 1 or more.

One logical block is allocated every n consecutive logical addresses sequentially from LBA 0. In the example of FIG. 2, there are m logical blocks.

The memory controller 12 allocates a physical block for each of the logical blocks 0 to m−1.

Also, the memory controller 12 does not assign a physical block to a logical block to which no data is written.

Also, host data may not be arranged in the order of LBA within physical blocks. The physical block assigned to each logical block may be a physical block of any position.

The host system 2 manages addresses in units of logical sectors and the memory controller 12 also manages addresses in units of physical sectors. The physical sector is, for example, a 512-byte data block.

The flash memory 11 manages addresses in a physical block that is a unit of data erasure.

Within physical blocks, addresses are managed in pages that are units of writing. A page is divided into physical sectors that are units of data.

For example, when the page size is 8 Kbytes, a data region of 16 physical sectors and an error correction code (ECC) region for the 16 physical sectors are included as an example. The number of physical sectors of the physical block is greater than or equal to the number of logical sectors of the logical block. That is, the number of physical sectors of the physical block may exceed the number of logical sectors of the logical block.

<Wear Leveling>

The memory controller 12 manages the erase count of each physical block in the flash memory 11.

A case in which two types of wear leveling processes are performed is shown in the present embodiment.

As a first type, a process of first wear leveling (also referred to as "dynamic wear leveling" for convenience of description) for moving data based on a write command from the host system 2 is performed.

As a second type, a process of second wear leveling (also referred to as "static wear leveling" for convenience of description) for moving data without being based on a write command from the host system 2 is performed.

<Dynamic Wear Leveling>

The memory controller 12 performs a dynamic wear leveling process in response to the reception of a command for writing data transmitted from the host system 2.

In the dynamic wear leveling, erase counts of physical blocks allocated to logical blocks in which writing is performed are averaged. However, because no rewriting is executed with respect to a physical block to which no data is rewritten in the dynamic wear leveling, no erasure is performed in the physical block and the erase count of the physical block does not change.

Various processes may be used as the dynamic wear leveling process.

For example, a process similar to the second wear leveling process described in Patent Document 2 may be used as the dynamic wear leveling process.

The dynamic wear leveling process in the present embodiment will be described.

In the dynamic wear leveling process according to the present embodiment, when data received from the host system 2 is written by the write command, data is written to a free physical block with a maximum erase count among free physical blocks (when a rewriting frequency is low) or data is written to a free physical block with a minimum erase count (when the rewriting frequency is high) in accordance with a rewriting frequency of the logical block. Writing to be performed may be designated by, for example, the host system 2 or may be randomly determined.

Figure 3:
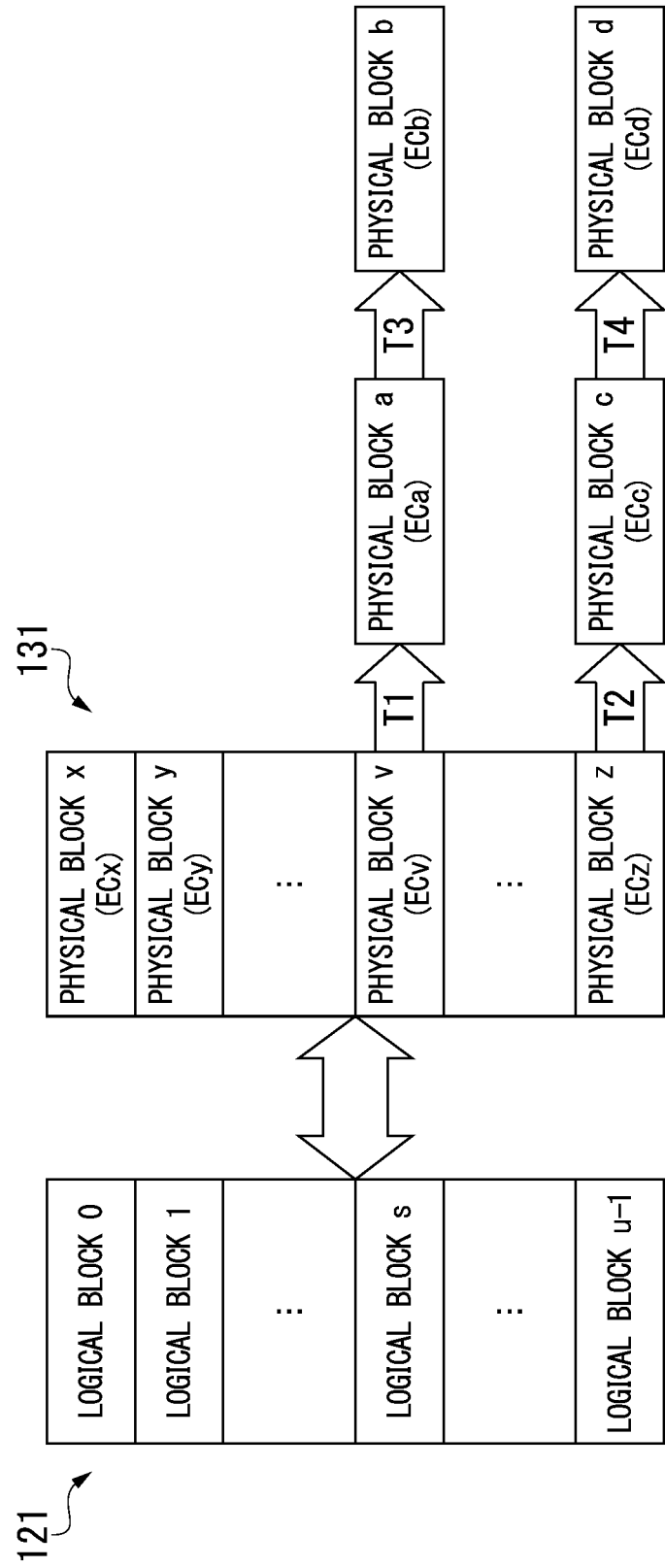
FIG. 3 is a diagram showing an example of rewriting of a physical block according to the embodiment.

FIG. 3 is a diagram showing an example of rewriting of a physical block according to the embodiment.

FIG. 3 shows an example of the allocation state of the logical block and the physical block.

In FIG. 3, u, s, x, y, v, z, a, b, c, and d, which are indices for illustration, represent numerical values.

In the example of FIG. 3, logical blocks 0 to u−1 are shown in a logical block group 121. Also, physical blocks of a physical block group 131 allocated to the logical blocks 0 to u−1 are shown. The logical block 0 corresponds to the physical block x. The logical block 1 corresponds to the physical block y. The logical block s corresponds to the physical block v. The logical block u−1 corresponds to the physical block z.

An erase count of the physical block x is set as ECx. An erase count of the physical block y is set as ECy. An erase count of the physical block v is set as ECv. An erase count of the physical block z is set as ECz.

Also, although a case in which physical blocks are allocated to all the logical blocks is shown for convenience of description in the example of FIG. 3, no physical block is allocated to a logical block that does not have valid data.

Processes (process T1 to process T4) to be performed from an allocation state shown in FIG. 3 are shown.

In the present example, it is assumed that no data write command is generated and no data is moved with respect to the physical block x and the physical block y.

In the present example, free physical blocks that satisfy a prescribed condition are searched for. As the prescribed condition, for example, the condition of a free physical block searched for in the dynamic wear leveling process is used.

Also, a process of writing host data to a free physical block with the minimum erase count is a general dynamic wear leveling process. If the process is not the general dynamic wear leveling process, free physical blocks are acquired regardless of the erase count and the erase counts are not averaged.

In order to simplify the description, the condition that writing is performed in all the physical sectors of a physical block by the write command all the time is assumed to be satisfied.

(Process T1)

When data is written to the logical block s, the memory controller 12 writes the data to a free physical block with an erase count satisfying the prescribed condition (set as a physical block a). Then, the memory controller 12 erases the data of the physical block v. Also, the memory controller 12 updates the erase count ECv of the physical block v by adding 1 thereto.

The memory controller 12 manages the physical block v as a free physical block and manages the logical block s and the physical block a in association.

Also, the erase count of the physical block a is set as ECa.

Also, in the present example, a case in which the memory controller 12 writes data to the free physical block having the minimum erase count is shown. As another example, the free physical block having the maximum or minimum erase count according to the state of the logical block may be acquired and data may be written to the acquired free physical block.

(Process T2)

When data is written to the logical block u−1, the memory controller 12 writes the data to a free physical block with an erase count satisfying a prescribed condition (set as a physical block c). Then, the memory controller 12 erases data of a physical block z. Also, the memory controller 12 updates the erase count ECz of the physical block z by adding 1 thereto.

The memory controller 12 manages the physical block z as a free physical block and manages the logical block u−1 and the physical block c in association.

Also, the erase count of the physical block c is set as ECc.

(Process T3)

When data is written to the logical block s, the memory controller 12 writes data to a free physical block with an erase count satisfying a prescribed condition (set as a physical block b). Then, the memory controller 12 erases the data of the physical block a. Also, the memory controller 12 updates the erase count ECa of the physical block a by adding 1 thereto.

The memory controller 12 manages the physical block a as a free physical block and manages the logical block s and the physical block b in association.

Also, the erase count of the physical block b is set as ECb.

(Process T4)

When data is written to the logical block u−1, the memory controller 12 writes the data to a free physical block with an erase count satisfying the prescribed condition (set as a physical block d). Then, the memory controller 12 erases the data of the physical block c. Also, the memory controller 12 updates the erase count ECc of the physical block c by adding 1 thereto.

The memory controller 12 manages the physical block c as a free physical block and manages the logical block u−1 and the physical block d in association.

Also, the erase count of the physical block d is set as ECd.

By iterating this process, erase counts of physical blocks other than physical blocks to which no data is rewritten (the physical block x and the physical block y in the present example) increase.

In this manner, when data from the host system 2 is written to a free physical block in the dynamic wear leveling, the memory controller 12 averages the erase counts of the physical blocks by selecting a free physical block with an erase count satisfying a condition specified in the dynamic wear leveling process. For example, although the erase counts are averaged when a method described in Patent Document 2 is used, the method described in Patent Document 2 is not sufficient compared with a method of acquiring a free physical block with a minimum erase count.

For example, the erase counts do not increase with respect to physical blocks that save data of which rewriting does not occur for a long period of time (the physical block x and the physical block y in the present example) and a variation may occur in the erase counts of the physical blocks.

<Static Wear Leveling>

In the static wear leveling process of the memory controller 12, for example, a condition for performing the static wear leveling process is set, the condition is constantly monitored, and the static wear leveling process is performed when the condition has been satisfied. Thus, the memory controller 12 performs the wear leveling process by rewriting the data written to the physical block to a free physical block regardless of a command for writing data from the host system 2.

In the static wear leveling, because an erase count of a physical block allocated to a logical block in which no data is rewritten for a long period of time is small, current valid data of the logical block is moved to a free physical block with a maximum erase count. Because rewriting does not frequently occur in the logical block, the erase count of the physical block allocated to the logical block does not increase. Also, erasure is performed in the physical block to which the data has been written and thereafter the erase count increases by allocating the physical block to a logical block having a relatively high rewriting frequency. Thereby, the erase counts of the physical blocks are averaged.

When there are a large number of logical blocks in which writing does not occur frequently, writing concentrates on some physical blocks. Then, when the service life of the physical block on which writing is concentrated ends and there are no free physical blocks, writing is disabled in the entire memory system 1. However, the service life of the flash memory 11 ends in spite of a small erase count of the entire system in which there are many physical blocks whose erase counts are significantly small compared with the service life because the erase count of the physical block allocated to the logical block in which writing does not frequently occur is small.

Also, in the flash memory 11, when time elapses after the data is written to the physical block, the data may deteriorate with the passage of time and the reliability of the data may decrease. Thus, it may be preferable to move data, which has long elapsed time after the data was written, to another physical block.

Therefore, in the static wear leveling, the erase counts are intended to be made uniform across all the physical blocks so that the service life of the flash memory 11 is extended.

In the static wear leveling, the erase counts of all the physical blocks are averaged by performing a rewriting process even on logical blocks in which writing does not frequently occur.

Also, even in a logical block in which a write count is small, there is no need to perform rewriting when writing has occurred recently.

Various processes may be used as the static wear leveling process.

For example, a process similar to the first wear leveling process described in Patent Document 2 may be used as the static wear leveling process.

The static wear leveling process in the present embodiment will be described.

When data from the host system 2 is written, the memory controller 12 saves a value corresponding to a maximum erase count of the flash memory 11 at that time in a logical block. Thereafter, when a difference between the value corresponding to the maximum erase count and a value corresponding to a current maximum erase count of the flash memory 11 is greater than or equal to a threshold value, the memory controller 12 causes the data of the logical block to be moved to another physical block (a physical block with the maximum erase count among free physical blocks).

Here, because the value corresponding to the maximum erase count of the flash memory 11 is a value that increases by performing an erasure process on a physical block to which previous data is written when writing is performed in the flash memory 11, writing is said to be old when the value is small. Thus, when a difference between a value corresponding to a current maximum erase count of the flash memory 11 and a value corresponding to a maximum erase count of the flash memory 11 for the logical block is large, the memory controller 12 determines that the logical block has not been updated for a while and determines that the erase count of the physical block allocated to the logical block is not large.

It is expected that data will be refreshed when rewriting is performed in the logical block, the physical block before rewriting will be used to write host data of another logical block with a relatively high rewriting frequency, and the erase count will increase. Also, the erase count of the physical block to which data is written in the static wear leveling process is large because the physical block is a free physical block with the maximum erase count and the erase count of the physical block is not updated for a while because a rewriting frequency of the logical block thereof is relatively low.

The erase count increases because a physical block with a small erase count is assigned to a logical block with a relatively high rewriting frequency and the erase count is not updated because a physical block with a large erase count is assigned to a logical block with a relatively low rewriting frequency, so that the erase counts are averaged.

A specific example is shown.

Here, a system maximum erase count is obtained based on information for managing physical blocks and is a maximum erase count in the flash memory 11.

A registered erase count is the number of times to be managed together with a physical block allocated for each logical block and indicates a value corresponding to the system maximum erase count when the physical block is allocated instead of the erase count of the physical block.

A registered minimum erase count is a registered erase count that is a minimum.

An available maximum erase count is obtained based on information for managing the physical block and is a maximum erase count among one or more erase counts corresponding to one or more free physical blocks, respectively.

The memory controller 12 determines whether or not a difference between the value corresponding to the system maximum erase count and the registered minimum erase count is less than a prescribed threshold value Th1. When the determination result is negative, the memory controller 12 determines whether or not a difference between the system maximum erase count and the available maximum erase count is less than a prescribed threshold value Th2. When the determination is affirmative, the memory controller 12 copies data from a physical block (a copy-source physical block) allocated to a logical block with the registered minimum erase count to a free physical block (a copy-destination physical block) corresponding to the available maximum erase count. The memory controller 12 assigns the copy-destination physical block to the logical block to which the copy-source physical block is assigned instead of the copy-source physical block. The memory controller 12 erases data from the copy-source physical block, updates the erase count of the copy-source physical block, and manages the copy-source physical block as a free physical block. At this time, data to be copied may be only valid data or may be copied in the order of logical addresses.

On the other hand, in the above-described two determinations, when the difference between the value corresponding to the system maximum erase count and the registered minimum erase count is less than the prescribed threshold Th1 or when the difference between the system maximum erase count and the available maximum erase count is not less than the prescribed threshold value Th2, the memory controller 12 does not perform a data copy process.

In the static wear leveling process, a determination is made in a logical block in which rewriting does not occur for a long period of time (the time of a prescribed threshold value or more). Also, the fact that rewriting does not occur for a long period of time does not necessarily mean that the erase count is small.

In the example of FIG. 3, for example, the static wear leveling process is performed if a condition for performing the static wear leveling process is satisfied with respect to the physical block x (the erase count ECx), the physical block y (the erase count ECy), or the like.

In this manner, in the static wear leveling, the memory controller 12 moves data to another physical block even when no write command has been generated from the host system 2 with respect to data of a physical block in which rewriting has not been performed for a long period of time. Thereby, a physical block in which rewriting has not occurred for a long period of time becomes a free physical block, rewriting of data to the physical block frequently occurs, and the erase counts of the physical blocks are averaged as a whole.

That is, the static wear leveling is a rewriting process on a logical block in which writing does not occur frequently.

<Problems of Static Wear Leveling>

Static wear leveling is performed in a background. The background is a state when the memory controller 12 is not executing a command process or a reset process. In the background, the host system 2 may interrupt the power supply of the memory controller 12 by determining that the memory controller 12 is not executing anything.

When there is a sudden power supply interruption while data is written to the flash memory 11, the memory controller 12 is unlikely to write data normally and may not be able to read data when data is read the next time. That is, the data may be lost. Also, even if a recovery process on the power supply interruption is performed at the next activation time, it cannot be said that the recovery process is perfect. Also, in the static wear leveling process, there is a method of searching all user data blocks for a block with the minimum erase count before host data is written by a write command, moving valid data of a physical block to a free physical block with a maximum erase count when the block is the physical block to which the valid data is written, and writing the host data to a physical block with the minimum erase count. Although this method does not care about the power supply interruption because of rewriting during the command, the command time becomes long and the performance deteriorates. Also, when the host sets a timeout, the command may time out. Thus, the static wear leveling process with the write command is hardly performed.

In the present embodiment, the static wear leveling process in the background will be described.

<Prohibited Logical Zone for Static Wear Leveling>

A range of logical blocks on which the static wear leveling process is not performed is referred to as a prohibited logical zone of static wear leveling (simply referred to as a "prohibited logical zone" for convenience of description). Also, the range of logical blocks on which the static wear leveling process is performed (all logical blocks other than the prohibited logical zone) is referred to as a permitted logical zone of static wear leveling (simply referred to as a "permitted logical zone" for convenience of description).

The prohibited logical zone according to the present embodiment will be described.

When important data are written to the flash memory 11, it is desirable to avoid an error due to the power supply interruption. Therefore, it is desirable that the memory controller 12 not perform the rewriting in the background with respect to a logical block corresponding to an LBA range of the important data.

Here, the important data includes, for example, system data of an operating system (OS), and the like. In the present embodiment, the host system 2 determines the important data. The important data may be predetermined.

In the present embodiment, the memory controller 12 sets the prohibited logical zone in a logical region. In the present embodiment, in the initialization of the memory system 1, the host system 2 designates the LBA range in which the static wear leveling process is not performed and therefore the memory controller 12 sets all logical blocks included in the LBA range in which the static wear leveling process is not performed as the prohibited logical zone. That is, in the present embodiment, the memory controller 12 sets the prohibited logical zone in accordance with the designation from the host system 2.

The setting of the prohibited logical zone may be set, for example, according to the method described in Patent Document 3.

Here, in the flash memory 11, it is generally said that the quality of a cell deteriorates as the erase count increases. In the flash memory 11, due to the increase in the erase count, writing or erasure is time-consuming and writing or erasing cannot be finally performed. Also, in the flash memory 11, the increase in the erase count may lower a data-holding capability, resulting in a reading error.

By setting the prohibited logical zone, data loss due to the power supply interruption during writing in the static wear leveling process is eliminated in a range thereof.

Also, if the same physical block is assumed to be used for both the prohibited logical zone and the permitted logical zone, a possibility that a physical block having a large erase count will be used also increases with respect to the prohibited logical zone. In this case, the quality of the physical block may deteriorate and data deterioration may occur.

Therefore, the region of the physical block allocated to the logical block of the prohibited logical zone is fixed in the present embodiment. The region of the physical block allocated to the logical block of the prohibited logical zone is set as a prohibited physical zone of static wear leveling (referred to as a "prohibited physical zone" for convenience of description) and the region of the physical block allocated to the logical block of the permitted logical zone is set as a permitted physical zone of static wear leveling (referred to as a "permitted physical zone" for convenience of description).

The memory controller 12 writes host data for the prohibited logical zone set in the logical region to the physical block of the prohibited physical zone set in the physical region.

In the present embodiment, because important data is assumed to be allocated to the prohibited logical zone and a rewrite count in the prohibited logical zone is less than that in the permitted logical zone, it is possible to prevent the quality of physical blocks allocated to the prohibited logical zone from deteriorating by setting the prohibited physical zone corresponding to the prohibited logical zone.

Also, in the present embodiment, because the host system 2 designates a static wear leveling prohibition range using the LBA which is addressing of the logical region, a boundary between an LBA range of prohibition and an LBA range of permission of the static wear leveling other than the boundary of the logical block may be set. Thus, in the present embodiment, the memory controller 12 sets, for example, all logical sectors of the logical block in which any LBA range of the prohibition of the static wear leveling is present as the prohibited logical zone.

The memory controller 12 writes user data to the physical block of the permitted physical zone set in the physical region in the static wear leveling process and the dynamic wear leveling process on the permitted logical zone set in the logical region. Thereby, the erase counts of physical blocks are averaged within the permitted physical zone.

Also, in the dynamic wear leveling process, a method of acquiring a free physical block with a minimum erase count or a maximum erase count may be performed according to a rewriting frequency of the logical block or a method of acquiring a free physical block with the minimum erase count may be performed regardless of the rewriting frequency of the logical block, with respect to the permitted logical zone. Also, at this time, the host system 2 may designate a method to be performed.

Also, although the dynamic wear leveling process may not be performed on the permitted logical zone, the erase counts can be further averaged when the dynamic wear leveling process is performed as in the present embodiment.

The memory controller 12 writes host data to the physical block of the prohibited physical zone in the dynamic wear leveling process on the prohibited logical zone. In the dynamic wear leveling process on the prohibited logical zone, a method of acquiring a free physical block with a minimum erase count or a maximum erase count may be performed according to a rewriting frequency of the logical block or a method of acquiring a free physical block with the minimum erase count may be performed regardless of the rewriting frequency of the logical block. Also, at this time, the host system 2 may designate a method to be performed.

Also, although the dynamic wear leveling process may not be performed on the prohibited logical zone, the erase counts of the physical blocks are appropriately averaged when the dynamic wear leveling process is performed if there is a difference in a rewrite count with respect to logical blocks in the prohibited logical zone. Because no static wear leveling is performed within the prohibited logical zone, the erase counts of the physical blocks may be uneven.

In the present embodiment, the host system 2 designates the dynamic wear leveling process with respect to the prohibited logical zone and the permitted logical zone set in the logical region at the time of the initialization of the memory system 1. Here, because a technique of acquiring free physical blocks for the prohibited logical zone and the permitted logical zone may be arbitrary for the memory controller 12, the host system 2 designates the technique in the present embodiment.

The host system 2 has access with only LBA in which the static wear leveling prohibition range is set. The host system 2 may set a plurality of LBA ranges for prohibiting the static wear leveling process.

The memory controller 12 determines a prohibited logical zone from the prohibited LBA range of static wear leveling designated by the host system 2. Then, the memory controller 12 obtains the number of physical blocks of the prohibited physical zone from the number of logical blocks of the prohibited logical zone, designates physical block equal in number to the number of physical blocks as user data blocks, and sets a range in which the physical blocks are present as the prohibited physical zone.

Also, physical blocks equal in number to a number of a result obtained by adding a prescribed number to the number of logical blocks of the prohibited logical zone may be set as the prohibited physical zone. The prescribed number is set in the memory controller 12. The prescribed number may be preset in the memory controller 12. Also, the permitted physical zone is set as the remaining physical blocks among the user data blocks.

In a general dynamic wear leveling process, host data is written to a free physical block with the minimum erase count.

Furthermore, in the technique described in Patent Document 2, the free physical block is changed according to a frequency of writing to the logical block.

Also, the static wear leveling process is described in Patent Document 2.

Also, a prohibited range in which the static wear leveling process is prohibited is described in Patent Document 3.

In the dynamic level wear leveling process on the prohibited logical zone and the permitted logical zone, two techniques may be able to be selected or one technique may be fixedly set.

Figure 4:
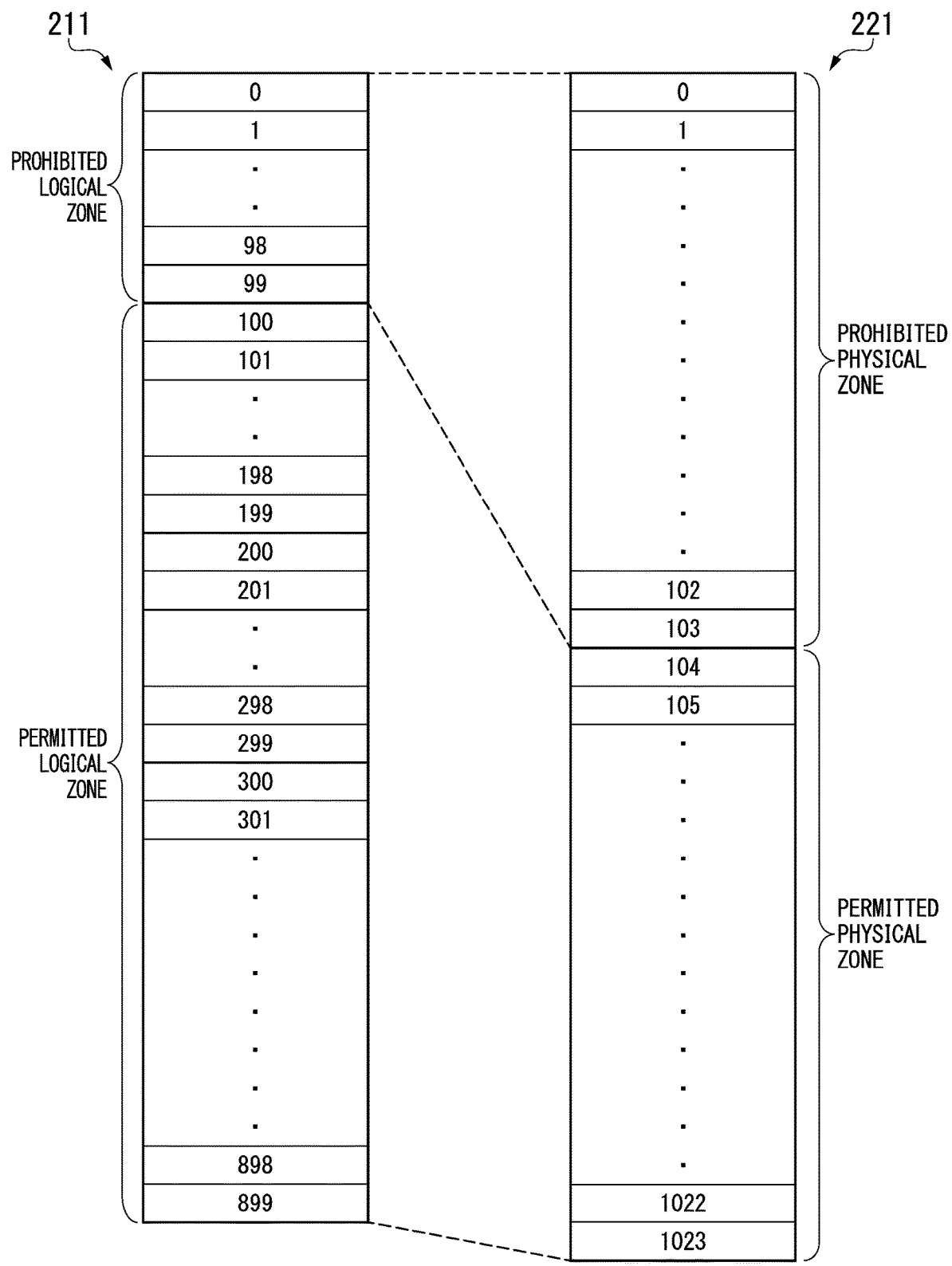
FIG. 4 is a diagram showing an example of a correspondence relationship between a logical block and a physical block according to the embodiment.

FIG. 4 is a diagram showing an example of a correspondence relationship between a logical block and a physical block according to the embodiment.

In the example of FIG. 4, in a logical block group 211, logical blocks 0 to 99 become a prohibited logical zone and logical blocks 100 to 899 become a permitted logical zone. Here, 0 to 899 shown in FIG. 4 are logical block numbers.

Also, in the example of FIG. 4, in the physical block group 221, physical blocks 0 to 103 become a prohibited physical zone and physical blocks 104 to 1023 become a permitted physical zone. Here, 0 to 1023 shown in FIG. 4 are physical block numbers.

In the example of FIG. 4, the host system 2 first sets LBA of a static wear leveling prohibition range.

The memory controller 12 sets the logical blocks 0 to 99 as the prohibited logical zone. Also, the memory controller 12 sets physical blocks 0 to 103 as the prohibited physical zone. The memory controller 12 stores and manages a correspondence relationship between the logical blocks 0 to 99 set as the prohibited logical zone and the physical blocks 0 to 103 set as the prohibited physical zone. Also, the memory controller 12 stores and manages the correspondence relationship between the logical blocks 100 to 899 set as the permitted logical zone and the physical blocks 104 to 1023 set as the permitted physical zone.

<Process in Memory Controller>

Figure 5:
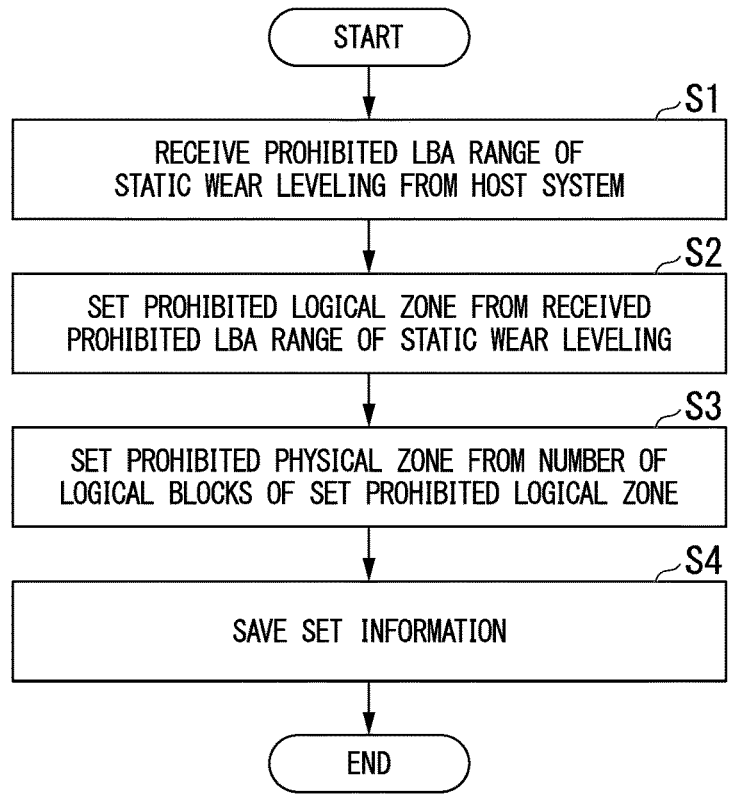
FIG. 5 is a diagram showing an example of a procedure of a process of setting of a prohibited physical zone according to the embodiment.

FIG. 5 is a diagram showing an example of a procedure of a process of setting of a prohibited physical zone according to the embodiment.

(Step S1)

An LBA range of a static wear leveling prohibition range is received from the host system 2. Then, the process proceeds to the processing of step S2.

(Step S2)

The memory controller 12 determines a prohibited logical zone corresponding to the LBA range of the prohibited range of the static wear leveling received from the host system 2 and the number of logical blocks of the prohibited logical zone. Then, the process proceeds to the processing of step S3.

(Step S3)

The memory controller 12 determines the number of physical blocks of the prohibited physical zone from the determined number of logical blocks of the prohibited logical zone and sets physical blocks of the prohibited physical zone to user data blocks. Then, the process proceeds to the processing of step S4.

(Step S4)

The memory controller 12 saves set information thereof. Then, the process of the present flow ends.

The set information is saved in the management information of the flash memory 11 or the like.

Here, logical blocks other than those of the prohibited logical zone are present in the permitted logical zone. Also, physical blocks of user data blocks other than those of the prohibited physical zone are present in the permitted physical zone. Also, even when any of the permitted logical zone and the permitted physical zone is not saved, it is possible to determine that all logical blocks other than those of the prohibited logical zone are a permitted logical zone and it is possible to determine that all physical blocks of user data blocks other than those of the prohibited physical zone are physical blocks of the permitted physical zone.

Figure 6:
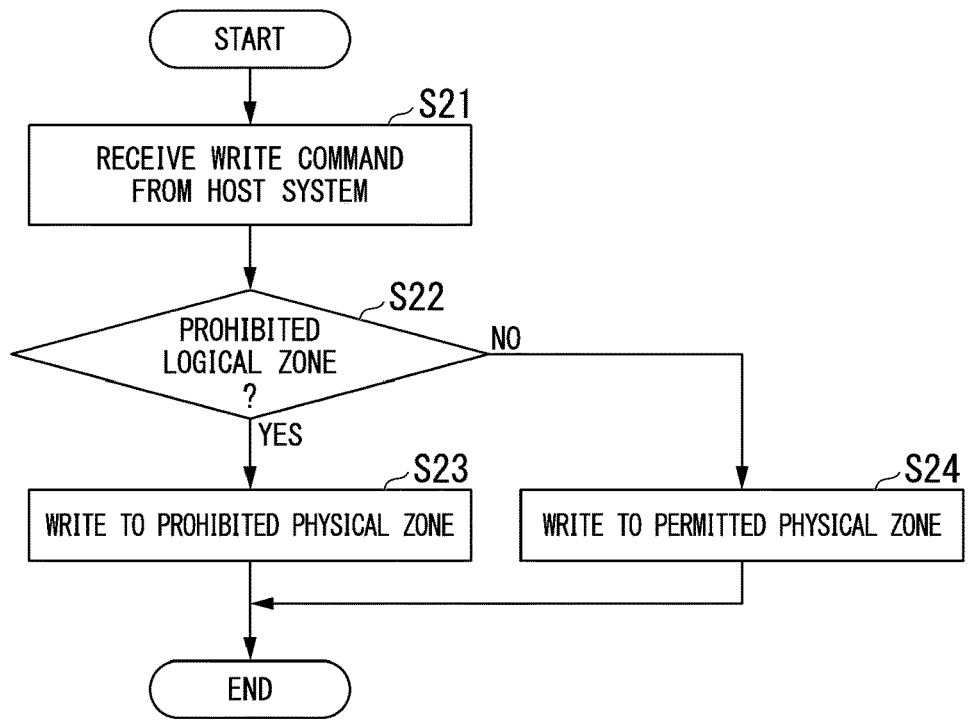
FIG. 6 is a diagram showing an example of a procedure of writing host data according to the embodiment.

FIG. 6 is a diagram showing an example of a procedure of writing host data according to the embodiment.

(Step S21)

The memory controller 12 receives a command for writing data from the host system 2. Then, the process proceeds to the processing of step S22.

(Step S22)

The memory controller 12 determines whether or not a logical address for which writing is designated from the host system 2 is a prohibited logical zone.

When a result is that the memory controller 12 determines that the logical address for which writing is designated from the host system 2 is the prohibited logical zone (step S22: YES), the process proceeds to the processing of step S23.

On the other hand, when the memory controller 12 determines that the logical address for which writing is designated from the host system 2 is not the prohibited logical zone (step S22: NO), the process proceeds to the processing of step S24.

(Step S23)

The memory controller 12 writes host data to physical blocks in the prohibited physical zone and performs a dynamic wear leveling process in the present embodiment. Then, the process of the present flow ends.

(Step S24)

The memory controller 12 writes host data to physical blocks of the permitted physical zone and performs the dynamic wear leveling process in the present embodiment. Then, the process of the present flow ends.

Also, the memory controller 12 performs a static wear leveling process in the permitted logical zone.

When the dynamic wear leveling process is performed in the prohibited logical zone or the permitted logical zone, the memory controller 12 performs a method of acquiring a free physical block with a minimum erase count or a maximum erase count according to a rewrite count of a logical block or a method of acquiring a free physical block with the minimum erase count regardless of the rewrite count of the logical block. Also, the host system 2 may designate a method to be performed. Also, it may not correspond to either one of the methods.

Figure 7:
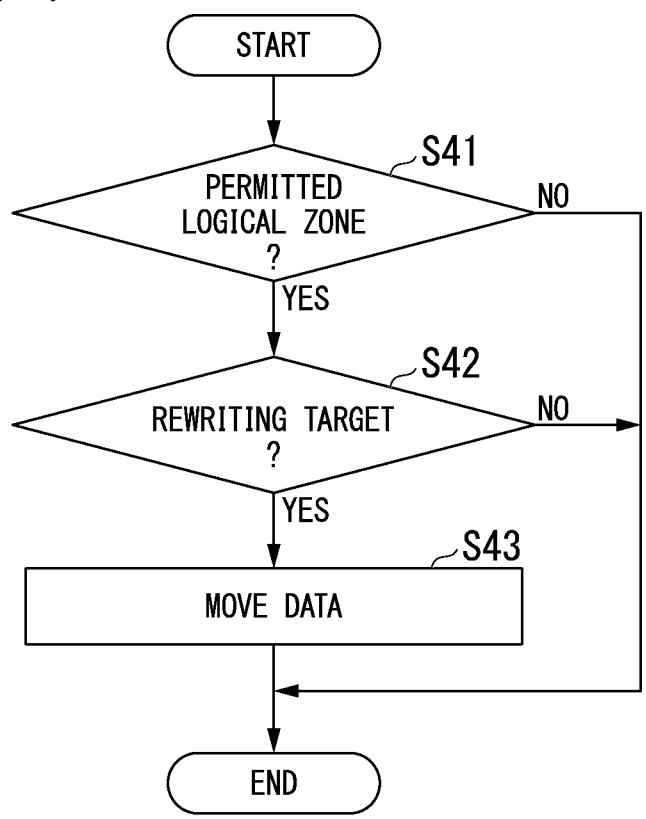
FIG. 7 is a diagram showing an example of a procedure of a static wear leveling process according to the embodiment.

FIG. 7 is a diagram showing an example of a procedure of the static wear leveling process according to the embodiment.

(Step S41)

The memory controller 12 determines whether a target logical block is a permitted logical zone.

When a result of the determination is that the memory controller 12 determines that the target logical block is the permitted logical zone (step S41: YES), the process proceeds to the processing of step S42.

On the other hand, when the result of the determination is that the memory controller 12 determines that the target logical block is not the permitted logical zone (i.e., the target logical block is the prohibited logical zone) (step S41: NO), the process of the present flow ends.

(Step S42)

The memory controller 12 checks a registered erase count of the target logical block and determines whether or not the target logical block is a rewriting target.

When a result of the determination is that the memory controller 12 determines that the target logical block is the rewriting target (step S42: YES), the process proceeds to the processing of step S43. On the other hand, when the result of the determination is that the memory controller 12 determines that the target logical block is not the rewriting target (step S42: NO), the process of the present flow ends.

(Step S43)

The memory controller 12 acquires a free physical block of a maximum erase count from a permitted physical zone and moves data of a logical block of a rewriting target. At this time, the memory controller 12 determines the possibility of rewriting from the erase count. Then, the process of the present flow ends.

<Summary of Embodiment>

The memory controller 12 in the memory system 1 according to the present embodiment can prevent important data stored in the flash memory from being lost while wear leveling is appropriately performed in the prohibited logical zone set in the logical region.

The memory controller 12 according to the present embodiment can maintain the quality of a physical block related to the prohibited logical zone and suppress the deterioration of reliability of data by fixing the prohibited physical zone related to the prohibited logical zone because the erase count of the physical block in the permitted physical zone increases and the reliability deteriorates. This is an effect of dividing the zones into the prohibited physical zone and the permitted physical zone in correspondence with the prohibited logical zone and the permitted logical zone. For example, if the host system 2 does not perform writing with respect to the prohibited logical zone by the number of times writing is performed with respect to the permitted logical zone, the erase count of the physical block of the prohibited physical zone related to the prohibited logical zone is not as large as the erase count of the physical block of the permitted physical zone related to the permitted logical zone.

The memory controller 12 according to the present embodiment can manage the erase counts of physical blocks of each physical zone.

The prohibited range of static wear leveling is designated by the host system 2 using LBA. For example, unlike the present embodiment, when a free physical block is selected from all physical blocks in the static wear leveling, important data is stored in a free physical block with a large erase count (i.e., poor quality) and the data may easily deteriorate.

Therefore, in the memory controller 12 according to the present embodiment, the data of the prohibited logical zone to which the important data is written is written to the free physical block with a small erase count (i.e., good quality) in the prohibited physical zone. In the prohibited logical zone, because rewriting of data does not frequently occur, data is relatively rarely updated and the erase count of the physical block of the prohibited physical zone hardly increases.

In the memory controller 12 according to the present embodiment, by designating the prohibited physical zone with respect to the prohibited logical zone, the prohibited logical zone and the prohibited physical zone are associated and the permitted logical zone and the permitted physical zone are associated. Then, the memory controller 12 performs the dynamic wear leveling process within the prohibited logical zone. Thereby, compared to the physical block in the permitted physical zone, the physical block in the prohibited physical zone has a small erase count and is intended to be a physical block with a good state.

Here, in the present embodiment, as the dynamic wear leveling process, a process of writing data to a free physical block with the minimum erase count or the maximum erase count from the state of the logical block is performed in writing of host data.

As another example, instead of this process, a process of writing data to a free physical block determined to have a small erase count according to a prescribed condition may be used. As the prescribed condition, for example, a condition that the erase count is determined to be small when the erase count is less than or equal to a prescribed threshold value may be used or a condition that the erase count is determined to be small until the erase count is increased by a prescribed value from a minimum may be used. Also, if there are two or more free physical blocks that satisfy the condition, one free physical block may be determined, for example, randomly or according to any prescribed condition.

Also, as another example, a process of writing host data to a free physical block with the minimum erase count regardless of the state of the logical block may be performed.

Also, the host system 2 may also designate any of these processes.

Also, in the static wear leveling process, various conditions may be used as a condition for determining a logical block for moving data. Also, when there are two or more logical blocks that satisfy the condition, one physical block may be determined, for example, randomly or according to any prescribed condition.

Also, in the static wear leveling process, various conditions may be used as a condition for determining a physical block which is a data movement destination and which has a large erase count. As the condition, for example, a condition for adopting a free physical block with the maximum erase count may be used, a condition for adopting a free physical block with an erase count exceeding a prescribed threshold value may be used, or a condition for adopting a free physical block with an erase count which is decreased by a prescribed value from a maximum may be used. Also, if there are two or more free physical blocks that satisfy the condition, one free physical block may be determined, for example, randomly or according to any prescribed condition.

As described above, in the present embodiment, a permitted logical zone on which the static wear leveling process is performed and a prohibited logical zone on which no static wear leveling process is performed are set. Because the static wear leveling process is basically performed in the background, it is necessary to prevent data from being lost due to a power supply interruption during the writing of data.

Also, in the present embodiment, the prohibited physical zone corresponding to the prohibited logical zone is fixed. In the prohibited logical zone, it is preferable that important data be written normally and that important data be written to a physical block with a small erase count (i.e., a physical block of good quality). Also, in the flash memory 11, the quality of the physical block deteriorates as the erase count of the physical block increases.

The range of the prohibited logical zone may be a continuous range or may be a plurality of non-continuous ranges.

In the dynamic wear leveling process, when the acquisition of the free physical block with the minimum erase count or the maximum erase count according to the state of the logical block and the acquisition of the free physical block with the minimum erase count regardless of the state of the logical block are selected, the host system 2 performs designation in the initialization of the memory system 1.

As another example, instead of this designation, the acquisition may be randomly selected and executed. Here, because a technique of acquiring the free physical block with respect to the prohibited logical zone may be arbitrary for the memory controller 12, the host system 2 performs designation in the present embodiment.

In the dynamic wear leveling process described in Patent Document 2, data is written to a free physical block with the minimum erase count with respect to rewriting of a logical block with a high rewriting frequency in writing with a write command. On the other hand, data is written to the free physical block of the maximum erase count with respect to rewriting of a logical block with a low rewriting frequency.

In the static wear leveling process, rewriting to a new physical block is performed with respect to a logical block for which relatively long time has elapsed after writing. At this time, the physical block becomes a free physical block with the maximum erase count.

The dynamic wear leveling process on the prohibited logical zone set in the logical region will be described.

When the dynamic wear leveling process is performed according to a rewriting frequency of the logical block in writing of the write command to the prohibited logical zone, the possibility of writing to the free physical block with the maximum erase count is high because a writing frequency related to the logical block of the prohibited logical zone is normally low.

Although the dynamic wear leveling process may be performed because the erase count of the physical block in the prohibited physical zone corresponding to the prohibited logical zone does not become so large when the rewriting frequency is low, it is preferable to use a free physical block with the minimum erase count regardless of a rewriting frequency of the logical block in order to equalize the erase counts of the physical blocks in the prohibited physical zone.

A logical block in which boundaries of the prohibited logical zone and the permitted logical zone coexist may not necessarily have a small write count and there is a possibility that a write count will be large in the logical block. In such a case, a difference in a rewriting frequency of the logical block in the prohibited logical zone largely differs according to the logical block and it is preferable to use a method of acquiring a free physical block with the minimum erase count or the maximum erase count according to the rewriting frequency of the logical block.

Although a free physical block may be randomly acquired in the prohibited physical zone, either one of the two techniques described above is preferable if possible. Thus, the host system 2 designates either one of the two techniques in the present embodiment.

In the dynamic wear leveling process on the permitted logical zone set in the logical region, a method of acquiring a free physical block with the minimum erase count or the maximum erase count according to a rewriting frequency of the logical block can be performed so that the erase counts of the physical blocks are the most uniform. Instead of this, a technique of acquiring a free physical block with the minimum erase count may be used regardless of a rewriting frequency of the logical block.

Also, although random acquisition may be performed in the permitted logical zone, the erase counts of the physical blocks are more averaged in the method of acquiring the free physical block with the minimum erase count or the maximum erase count according to the rewriting frequency of the logical block. If the minimum erase count is acquired regardless of the rewriting frequency of the logical block and writing to the physical block with a small erase count is performed with respect to a logical block in which rewriting does not frequently occur, the erase count is significantly different from that of another physical block because the erase count of the physical block is maintained as it is until the physical block becomes a static wear leveling target.

As an example of a configuration, the memory controller 12 controls access to the flash memory 11 including a plurality of physical blocks, each of which includes a plurality of pages, based on a command assigned from the host system 2.

The memory controller 12 stores a first correspondence relationship representing a correspondence relationship between a logical block of a first logical region set in a logical region (a logical block corresponding to a prohibited logical zone in the present embodiment) and a physical block of a first physical region set in a physical region (a physical block corresponding to a prohibited physical zone in the present embodiment) in a first storage unit (for example, the flash memory 11 in the present embodiment).

The memory controller 12 manages the first physical region as a region for prohibiting a process of moving data without receiving a command for writing data from the host system 2 to the first logical region.

As an example of a configuration, the memory controller 12 performs a process of writing data to the first physical region based on the first correspondence relationship according to a first process when a command for writing data to the first logical region has been received from the host system 2.

The first process (an example of a dynamic wear leveling process in the present embodiment) is a process of writing the data to a physical block with the minimum erase count or the maximum erase count among writable physical blocks of the first physical region based on a state of the logical block of the first logical region.

As an example of a configuration, the memory controller 12 performs a process of writing data to the first physical region based on the first correspondence relationship according to the first process when a command for writing data to the first logical region has been received from the host system 2.

The first process is a process of writing data to the physical block with the minimum erase count among the writable physical blocks of the first physical region.

As an example of a configuration, the memory controller 12 performs a process of writing data to the first physical region based on the first correspondence relationship according to the first process when a command for writing data to the first physical region has been received from the host system 2.

The first process is a process designated from the host system 2 between a process of writing data to a physical block with a minimum erase count or a maximum erase count among writable physical blocks of the first physical region and a process of writing data to a physical block with the minimum erase count among the writable physical blocks of the first physical region based on a state of the logical block of the first logical region.

As an example of a configuration, the memory controller 12 sets a logical block of a second logical region different from the first logical region (a logical block corresponding to the permitted logical zone in the present embodiment) in the logical region, sets a physical block of a second physical region different from the first physical region (a physical block corresponding to the permitted physical zone in the present embodiment) in the physical region, and stores a second correspondence relationship indicating a corresponding relation therebetween in a second storage unit (for example, the flash memory 11 in the present embodiment).

When a command for writing data to the second logical region has been received from the host system 2, the memory controller 12 performs a process of writing data to the second physical region based on the second correspondence relationship according to the first process.

The memory controller 12 manages the second physical region as a region for permitting a second process of moving data (an example of a static wear leveling process in the present embodiment) even when a command for writing data to the second logical region is not received from the host system 2. The first process is a process of writing data to the physical block with the minimum erase count or the maximum erase count among the writable physical blocks of the second physical region based on the state of the logical block of the second logical region.

As an example of a configuration, the memory controller 12 stores a second correspondence relationship representing a correspondence relationship between a logical block of a second logical region different from the first logical region and a physical block of a second physical region different from the first physical region in the second storage unit.

The memory controller 12 performs a process of writing data to the second physical region based on the second correspondence relationship according to the first process when a command for writing data to the second logical region has been received from the host system 2.

The memory controller 12 manages the second physical region as a region for permitting the second process of moving data even when the command for writing data to the second logical region is not received from the host system 2.

The first process is a process of writing data to the physical block with the minimum erase count among the writable physical blocks of the second physical region.

As an example of a configuration, the memory controller 12 stores a second correspondence relationship representing a correspondence relationship between a logical block of a second logical region different from the first logical region and a physical block of a second physical region different from the first physical region in the second storage unit.

The memory controller 12 performs a process of writing data to the second physical region based on the second correspondence relationship according to the first process when a command for writing data to the second logical region has been received from the host system 2.

The memory controller 12 manages the second physical region as a region for permitting the second process of moving data even when the command for writing data to the second logical region is not received from the host system 2.

The first process is a process designated from the host system 2 between a process of writing data to a physical block with a minimum erase count or a maximum erase count among writable physical blocks of the second physical region and a process of writing data to a physical block with the minimum erase count among the writable physical blocks of the second physical region based on a state of the logical block of the second logical region.

Also, because a logical region other than the first logical region normally becomes the second logical region and a physical region other than the first physical region normally becomes the second physical region the second correspondence relationship may not be stored.

An example of a configuration is the memory system 1 including the flash memory 11 including a plurality of physical blocks, each of which includes a plurality of pages, and the memory controller 12 of the above-described example of the configuration for controlling access to flash memory 11 based on a command assigned from host system 2.

Although the embodiments of the present invention have been described above in detail with reference to the drawings, the specific configurations are not limited to the embodiments and design changes and the like are also included without departing from the scope of the present invention.

Also, functions of any configuration unit in the above-described device (for example, the memory controller 12 or the like) may be implemented by recording a program for implementing the functions on a computer-readable recording medium and causing a computer system to read and execute the program. Also, the computer system described here is assumed to include an operating system (OS) and hardware such as peripheral devices. Also, the computer-readable recording medium refers to a storage apparatus including a flexible disk, a magneto-optical disc, a read only memory (ROM), a portable medium such as a compact disc (CD)-ROM, and a hard disk embedded in the computer system. Furthermore, the "computer-readable recording medium" is assumed to include a medium that holds a program for a fixed period of time, such as a volatile memory (for example, a random access memory (RAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions. Further, the above-described program may be a program capable of implementing the above-described functions in combination with a program already recorded on the computer system, i.e., a so-called differential file (differential program).

EXPLANATION OF REFERENCES

1 Memory system
2 Host system
11 Flash memory
11A First region
11B Second region
11C Third region
12 Memory controller
12A Processor
12B ROM
12C First RAM
12D Second RAM
12E Buffer
12F First interface
12G Second interface
111 Host address group
121, 211 Logical block group
131, 221 Physical block group

What is claimed is:

1. A memory system including a flash memory including a plurality of physical blocks, each of which includes a plurality of pages, and a memory controller configured to control access to the flash memory based on a command assigned from a host system,
   wherein the memory controller is configured to store a first correspondence relationship representing a correspondence relationship between a logical block of a first logical region and a physical block of a first physical region in a first storage unit,
   the memory controller is configured to manage the first physical region as a region in which a static wear leveling process is prohibited,
   a second correspondence relationship representing a correspondence relationship between a logical block of a second logical region different from the first logical region and a physical block of a second physical region different from the first physical region is stored in a second storage unit, and
   the second physical region is managed as a region in which the static wear leveling process is permitted.

2. A memory controller for controlling access to a flash memory including a plurality of physical blocks, each of which includes a plurality of pages, based on a command assigned from a host system,
   wherein the memory controller is configured to store a first correspondence relationship representing a correspondence relationship between a logical block of a first logical region and a physical block of a first physical region in a first storage unit,
   the memory controller is configured to manage the first physical region as a region in which a static wear leveling process is prohibited,
   a second correspondence relationship representing a correspondence relationship between a logical block of a second logical region different from the first logical region and a physical block of a second physical region different from the first physical region is stored in a second storage unit, and
   the second physical region is managed as a region in which the static wear leveling process is permitted.

3. The memory controller according to claim 2,
   wherein a first process of writing data to the physical block of the first physical region based on the first correspondence relationship is performed when the command for writing the data to the first logical region has been assigned from the host system, and
   the first process is a process of writing the data to a physical block with a minimum erase count or a maximum erase count among writable physical blocks of the first physical region based on a state of the logical block of the first logical region.

\* \* \* \* \*